United States Patent
Saeueng et al.

(10) Patent No.: US 7,541,793 B2
(45) Date of Patent: Jun. 2, 2009

(54) PARALLEL POWER SUPPLY WITH ACTIVE DROOP CURRENT SHARING CIRCUIT HAVING CURRENT LIMITING FUNCTION

(75) Inventors: Sakda Saeueng, Samutprakarn (TH); Ming Chun Xu, Samutprakarn (TH)

(73) Assignees: Delta Electronics, Inc., Taoyuan Hsien (TW); Delta Electronics (Thailand) Public Company, Limited, Samutprakarn (TH)

( * ) Notice: Subject to any disclaimer, the term of this patent is extended or adjusted under 35 U.S.C. 154(b) by 491 days.

(21) Appl. No.: 11/146,823

(22) Filed: Jun. 7, 2005

(65) Prior Publication Data

US 2006/0273740 A1 Dec. 7, 2006

(51) Int. Cl.
G05F 1/00 (2006.01)

(52) U.S. Cl. .................. 323/284; 363/142; 307/43; 323/282

(58) Field of Classification Search ............ 323/274, 323/277, 284, 276, 282, 283, 313; 363/142; 307/43

See application file for complete search history.

(56) References Cited

U.S. PATENT DOCUMENTS

| | | | | |
|---|---|---|---|---|
| 4,176,379 | A | * | 11/1979 | Wessler et al. ............. 358/409 |
| 5,028,861 | A | * | 7/1991 | Pace et al. ................. 323/222 |
| 6,057,607 | A | * | 5/2000 | Rader et al. ................ 307/11 |
| 6,078,510 | A | * | 6/2000 | Spampinato et al. ..... 363/21.13 |
| 6,396,252 | B1 | * | 5/2002 | Culpepper et al. ......... 323/285 |
| 6,429,631 | B2 | * | 8/2002 | Inaba et al. ............... 323/277 |
| 6,737,845 | B2 | * | 5/2004 | Hwang ...................... 323/284 |
| 6,744,649 | B1 | * | 6/2004 | Yang et al. ................. 363/98 |
| 6,897,639 | B2 | * | 5/2005 | Koernle et al. ............. 323/277 |
| 6,933,706 | B2 | * | 8/2005 | Shih .......................... 323/222 |
| RE39,065 | E | * | 4/2006 | Nelson ...................... 323/284 |
| 7,259,972 | B2 | * | 8/2007 | Yang ....................... 363/21.16 |
| 2004/0178779 | A1 | * | 9/2004 | Walters et al. ............. 323/277 |
| 2005/0127883 | A1 | * | 6/2005 | Hoshino et al. ............ 323/274 |
| 2006/0077697 | A1 | * | 4/2006 | Yang ....................... 363/21.13 |

\* cited by examiner

*Primary Examiner*—Akm E Ullah
*Assistant Examiner*—Arun Williams

(57) ABSTRACT

An active droop current sharing technique combined with current limiting function is employed in a parallel power supply. The parallel power supply is characterized with a current sensing amplifier that generates a current feedback signal representing a difference between a nominal output voltage and a fractional output voltage. The current sensing amplifier is coupled to a threshold level generator providing a threshold level defining a voltage level corresponding to a maximum allowed output current of the parallel power supply. If the voltage level of the current feedback signal exceeds the threshold level, the threshold level generator is turned on and the current feedback signal is coupled to a switching controller to adjust the output voltage of the power converter for properly addressing the current imbalance among plural parallel power supplies. Meanwhile, the threshold level generator induces a current to the current sense input of the switching controller, thereby limiting the output current of the power converter from exceeding the maximum allowed output current.

9 Claims, 2 Drawing Sheets

PARALLEL POWER SUPPLY WITH ACTIVE DROOP CURRENT SHARING CIRCUIT HAVING CURRENT LIMITING FUNCTION

FIELD OF THE INVENTION

The present invention is related to a current sharing technique for use in a parallel power supply, and more particularly to an active droop current sharing circuit having a current limiting function for use in a parallel power supply.

BACKGROUND OF THE INVENTION

Switching power supply generally functions as a basic power supply unit for delivering electricity to satisfy the needs of electronic systems. For example, DC-DC converters are usually designed to convert a direct current (DC) voltage level to one or more different DC voltage levels that can meet a set of specifications.

In practical operation, two or more DC-DC converters are connected in parallel to form a parallel power supply system when supplying power to an electronic system in consideration of load capacities. The parallel power supply system can provide a high-level redundancy for particular applications that requires power to be distributed with a high continuity and high reliability.

Theoretically, parallel power supplies are set to share the load current equally. That is, each parallel power supply in a parallel power supply system is set to provide an approximately equal proportion of the total load current provided to a common load. In many practical applications, however, parallel power supplies frequently experience variations in their respective output voltages due to factors such as temperature coefficient, aging and output impedance differences, thereby making exact current matching between parallel power supplies relatively difficult to achieve.

Though the current sharing technique can help a plurality of power converters share the load current equally, it is possible that an imbalance in the sharing of the load current among power converters would be generated when an abrupt change is occurred to the parallel power supply. The unequal sharing of load current by the parallel power supplies may degrade the performance and reliability of a parallel power supply system. This problem is of particular concern when the power converters use synchronous rectification due to the inherent feedback properties of these circuits. In certain situations, it may be possible for a power converter having a lower output voltage than another converter to sink current from the other power converters, thereby further degrading the efficiency of the power circuit. This sink current is typically dependent upon the voltage difference between power converters, and by their output impedances.

In the absence of forced current sharing, power converters in a parallel arrangement are often configured to operate in a current limit mode that prohibits the output current from exceeding a particular value. In such cases, a converter at a higher output voltage and/or lower output impedance frequently provides the maximum allowed current, with converters with lower output voltages and/or higher output impedances idling with relatively little or no output current, or worse, sinking current from the heavily-loaded power converters. The efficiency of the current-limited power converters is therefore relatively low, and the efficiency of the idling (sinking) power converters is effectively zero, since the sinking converter is delivering no power, but is consuming power. Effective current sharing will therefore generally improve the total efficiency of a parallel power supply system.

Numerous techniques have been presented to implement the current sharing arrangement. One of the most commonly used current-sharing technique is made by electronically adding an output voltage droop as a function of output current, thereby allowing the output voltage to be adjusted downward as a function of current. The technique of compensating the load current sharing in terms of voltage droop is generally termed as droop current sharing, in which the output voltage of each parallel power supply depends on its output current. In such case, each parallel power supply allots respective current sharing pins paralleled on the backplane, so that the parallel power supplies share the information about their load current. When the output current of one parallel power supply increases, its output voltage slightly decreases to force the other parallel power supplies to take more load current. If all parallel power supplies are adjusted to the same voltage at a given load and have the same voltage versus current slope, they will share the load with high accuracy. With this current sharing scheme, an automatic current sharing mechanism can be achieved without the requirement of an interconnection bus.

In most of DC power supplies, it is desirable to provide a constant DC voltage. Thus, a feedback circuit is ubiquitously required in a DC power supply for maintaining a constant output voltage. In a parallel power supply system, each parallel power supply uses the actual current feedback signal to adjust its output voltage reference so that all the parallel power supply shares the load current. In this manner, most of the DC power supplies provide an overcurrent protection function that restrains the output current within a maximum rated value according to the output voltage versus output current characteristic.

FIG. 1 shows a conventional parallel power supply provided with active droop current sharing and overcurrent protection function. In FIG. 1, a DC-DC converter 100 is paralleled on a backplane (not shown) to provide one or more predetermined voltage levels to a common load 101 and share a proportion of the total load current with the other parallel power supplies. The active droop current sharing circuit 110 includes a current sensing resistor Rs placed between the output end of the DC-DC converter 100 and the common load 101 for developing a voltage proportional to the output current, so that the actual output voltage of the DC-DC converter 100 corresponds to the nominal output voltage of the DC-DC converter 100 minus the voltage drop across the current sensing resistor Rs. Also, a current sharing amplifier 111 is placed between the current sensing resistor Rs and a switching controller 103 coupled to the DC-DC converter 100. The current sharing amplifier 111 amplifies the difference between the nominal output voltage and a fractional output voltage obtained through a voltage divider 122 and outputs the amplified difference value representative of the output current provided by the parallel power supply. The amplified difference value is fed into the switching controller 103 to enable the switching controller 103 to make fine adjustments to the duty cycle of the switching transistor circuit (not shown) of the DC-DC converter 100, thereby adjusting the output voltage of each parallel power supply and correcting the current imbalance by selectively adjusting the duty cycle through extending the trailing edge of the switching control signals issued by the switching control 103 of each parallel power supply.

In addition, an overcurrent detection circuit 120 is coupled between an output end of the DC-DC converter 100 and the switching controller 103. The overcurrent detection circuit 120 includes an error operation circuit 121 for comparing the nominal output voltage and the actual output voltage and producing a current feedback signal dependent on the output voltage. The current feedback signal is fed to the inverting input terminal of an error amplifier 122. The error amplifier 122 amplifies the current feedback signal into an error voltage signal representing the difference between the current feedback signal and a first reference signal Vref1. The error voltage signal is coupled to the switching controller 103 to compensate for the variation of the output voltage of the DC-DC converter 100. Also, The error voltage signal functions as a current command signal that enables the switching controller 103 to monitor and control the output current of the DC-DC converter 100 in response to the error voltage signal, so that the current sense input of the switching controller 103 can be activated promptly to limit the output current of the DC-DC converter 100 from exceeding its maximum rated value. If the output current of the DC-DC converter 100 exceeds its maximum rated value, the switching controller 103 stops transmitting switching control signals supplied to the switching transistor circuit of the DC-DC converter 100 and shut down the switching operation of the DC-DC converter 100 to avoid damages.

Also, the parallel power supply 100 includes an overcurrent protection (OCP) status signal generator 130. The OCP status signal generator 130 includes an OCP comparator 131 for comparing the nominal output voltage of the DC-DC converter 100 with a second reference voltage Vref2 to determine if an overcurrent event is occurred. If it is determined that an overcurrent event is occurred, the OCP comparator 131 produces an OCP status signal and transmits the OCP status signal to housekeeping circuits (not shown) to warn other circuitries within the parallel power supply system of the overcurrent event in the parallel power supply.

Although the conventional parallel power supply of FIG. 1 is sufficient to provide current sharing among plural parallel power supplies and overcurrent protection capability, the prior art parallel power supply suffers several major disadvantages. For example, the accuracy of current sharing in the conventional parallel power supply is limited. Further, the conventional parallel power supply incorporates a large quantity of active elements in the active droop current sharing circuit and overcurrent detection scheme, which would result in a bulky electronic product. Accordingly, the conventional parallel power supply will be oversized and lacks flexibility in circuit design. The present invention is proposed to downsize the parallel power supply and provide greater flexibility in the circuit configuration for the parallel power supply.

SUMMARY OF THE INVENTION

Briefly summarized, the present invention provides a parallel power supply with an active droop current sharing circuit having a current limiting function.

According to a preferred embodiment of the present invention, the active droop current sharing circuit comprises a current sensor placed between an output end of a power converter and a common load for generating a sensed output voltage, a current sensing amplifier coupled to the current sensor for amplifying the sensed output voltage to generate a current feedback signal, a threshold level generator coupled to the current sensing amplifier for setting a threshold level equivalent to a voltage level corresponding to a maximum allowed output current of the power converter, and conducting a current when the voltage level of the current feedback signal is above the threshold level, and a switching controller coupled to the power converter and the threshold level generator for adjusting the output voltage responsive to the current feedback signal and limiting the output current form exceeding the maximum allowed output current by sensing the current flowing through the threshold level generator.

The foregoing and other features and advantages of the present invention will be best understood through the following descriptions with reference to the accompanying drawings, wherein:

DETAILED DESCRIPTION OF THE PREFERRED EMBODIMENT

Figure 1:
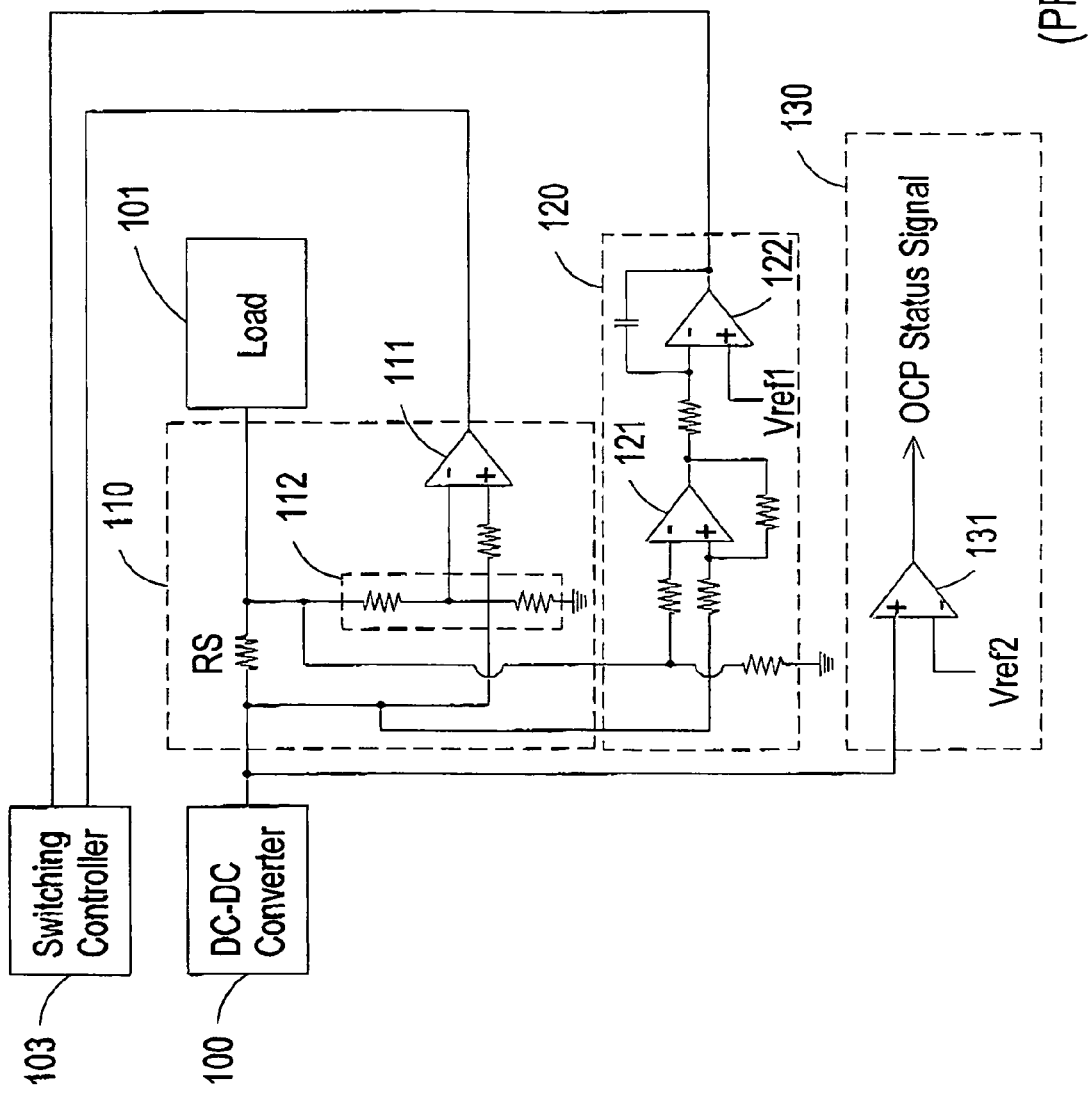
FIG. 1 is a circuit diagram of a conventional parallel power supply.
Figure 2:
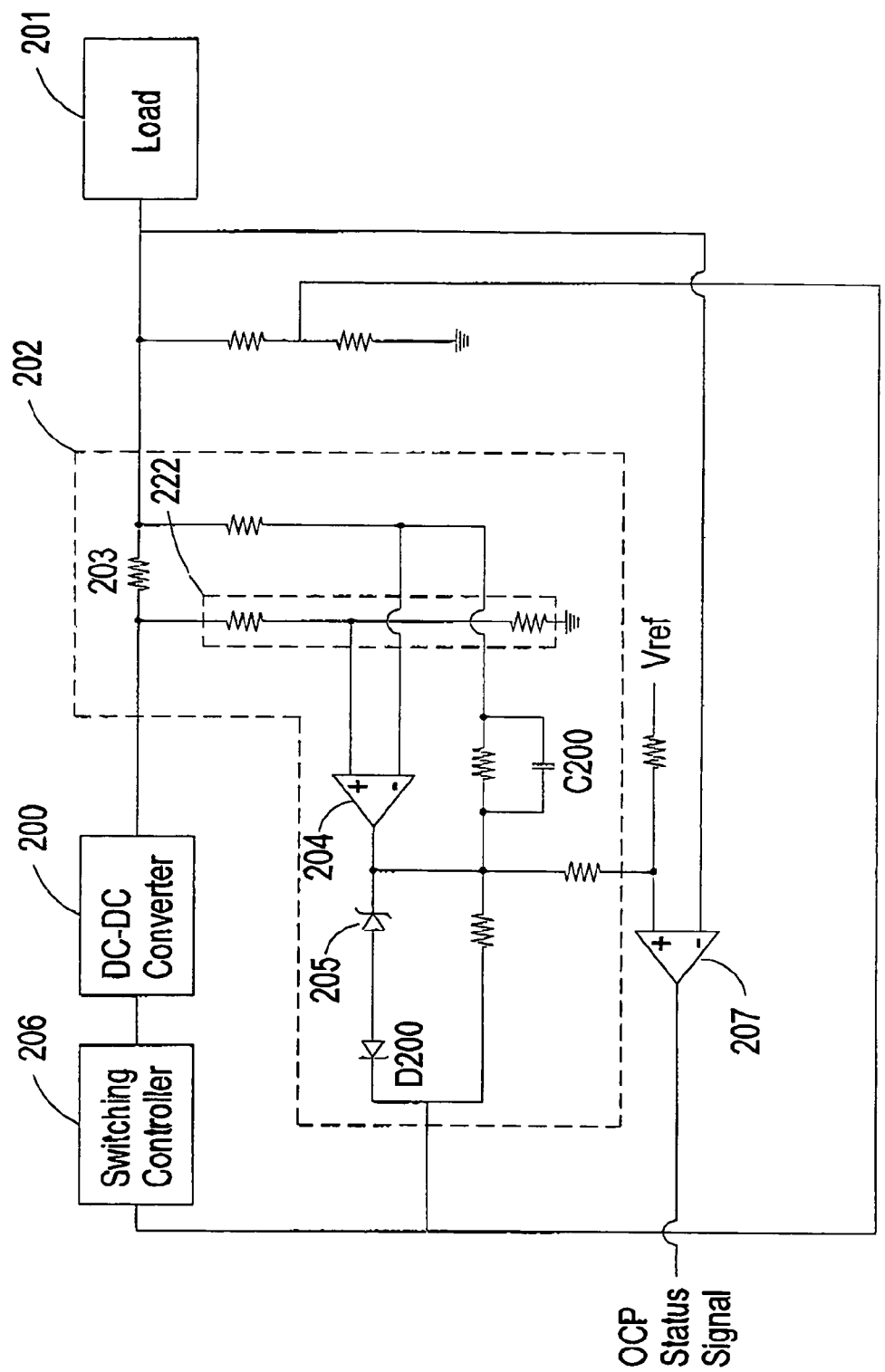
FIG. 2 is a circuit diagram of a parallel power supply according to a preferred embodiment of the present invention.

FIG. 2 illustrates a parallel power supply including an active droop current sharing circuit having a current limiting function according to a preferred embodiment of the present invention.

The parallel power supply of FIG. 2 includes a DC-DC converter 200 set to provide a predetermined voltage level to a common load 201 and share a proportion of the total load current with the other parallel power supplies. Also, the parallel power supply of FIG. 2 includes an active droop current sharing circuit 202 coupled between the DC-DC converter 200 and the common load 201. The active droop current sharing circuit 202 includes a current sensing resistor 203 placed in series with the common load 201 for developing a voltage proportional to the output current, so that the actual output voltage of the DC-DC converter 200 corresponds to the nominal output voltage of the DC-DC converter 200 minus the voltage drop across the current sensing resistor 203. Also, a current sensing amplifier 204 is coupled to the current sensing resistor 203, and having an non-inverting input terminal coupled to a nominal output voltage and an inverting input terminal coupled to a fractional output voltage obtained through a voltage divider 222. The current sensing amplifier 204 is used for amplifying the sensed voltage generated across the current sensing resistor 203 in order to produce an amplified sensed output voltage representative of the output current provided by the parallel power supply. Particularly, the amplified sensed output voltage provided by the current sensing amplifier 204 functions as a current feedback signal that enables a switching controller 206 to diminish the duty cycle of the switching transistor circuit (not shown) of the DC-DC converter 200, thereby reducing the output voltage of the parallel power supply to achieve proper current balance among plural parallel power supplies when the output current of the parallel power supply increases above the required load current sharing.

The current sensing amplifier 204 is further coupled to a threshold level generator 205 coupled between the current sensing amplifier 204 and the switching controller 206. The threshold level generator 205 is typically implemented by a zener diode according to the present embodiment. The zener diode 205 is used to set a threshold level, for example, the breakdown voltage of the zener diode, as a criterion for limiting the output current of the DC-DC converter 200 from exceeding the maximum rated value. For example, the breakdown voltage of the zener diode is set 10 volts, which is also the voltage level corresponding to the maximum rated value of the output current. In normal operation, the zener diode 205 is turned off. However, if the voltage level of the current feedback signal is greater than the breakdown voltage of the zener diode, the zener diode works in the breakdown region and starts to conduct current. The current is fed to the current sense input of the switching controller 206 to activate the overcurrent protection function of the switching controller 206, thereby accomplishing current limiting function.

Further, the parallel power supply includes an OCP comparator 207 for comparing the output voltage of the DC-DC converter 200 with a reference voltage Vref to determine if an overcurrent event is occurred. If it is determined that an overcurrent event is occurred, the OCP comparator 207 produces an OCP status signal and transmits the OCP status signal to housekeeping circuits (not shown) to warn other circuitries within the parallel power supply system of the overcurrent event in the parallel power supply.

It is to be noted that a diode D200 is coupled between the zener diode 205 and the switching controller 206. The diode D200 is used for ensuring the correct polarity of the voltage across the zener diode 205. Also, the active droop current sharing circuit 202 includes a capacitor C200 for stabilizing the control loop of the active droop current sharing circuit 202.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

The invention claimed is:

1. A parallel power supply comprising:
   a power converter for converting an input voltage into an output voltage having a different voltage level with the input voltage;
   a current sensor coupled to an output end of the power converter for sensing the output voltage to generate a sensed output voltage proportional to an output current of the power converter;
   a current sensing amplifier coupled to the current sensor for amplifying the sensed output voltage to generate an amplified sensed output voltage representative of the output current provided by the power converter of the parallel power supply as a current feedback signal; and
   a threshold level generator coupled to the current sensing amplifier for setting a threshold level equivalent to a voltage level corresponding to a maximum allowed output current of the power converter, and conducting a current when the voltage level of the current feedback signal is above the threshold level.

2. The parallel power supply according to claim 1 wherein the current sensor comprises a current sensing resistor.

3. The parallel power supply according to claim 1 wherein the threshold level generator comprises a zener diode.

4. The parallel power supply according to claim 1 further comprising a switching controller coupled to the power converter and the threshold level generator for adjusting the output voltage responsive to the current feedback signal and limiting the output current form exceeding the maximum allowed output current by sensing the current flowing through the threshold level generator.

5. The parallel power supply according to claim 4 further comprising a diode coupled between the threshold level generator and the switching controller for ensuring a correct polarity of a voltage across the threshold level generator.

6. A parallel power supply comprising:
   a power converter for converting an input voltage into an output voltage having a different voltage level with the input voltage;
   a current sensor coupled to an output end of the power converter for sensing the output voltage to generate a sensed output voltage proportional to an output current of the power converter;
   a current sensing amplifier coupled to the current sensor for amplifying the sensed output voltage to generate an amplified sensed output voltage representative of the output current provided by the power converter of the parallel power supply as a current feedback signal;
   a threshold level generator coupled to the current sensing amplifier for setting a threshold level equivalent to a voltage level corresponding to a maximum allowed output current of the power converter, and conducting a current when the voltage level of the current feedback signal is above the threshold level; and
   a switching controller coupled to the power converter and the threshold level generator for adjusting the output voltage responsive to the current feedback signal and limiting the output current form exceeding the maximum allowed output current by sensing the current flowing through the threshold level generator.

7. The parallel power supply according to claim 6 wherein the current sensor comprises a current sensing resistor.

8. The parallel power supply according to claim 6 wherein the threshold level generator comprises a zener diode.

9. The parallel power supply according to claim 6 further comprising a diode coupled between the threshold level generator and the switching controller for ensuring a correct polarity of a voltage across the threshold level generator.

* * * * *